United States Patent
Wyffels (10) Patent No.: US 12,118,798 B2
(45) Date of Patent: Oct. 15, 2024

(54) AUTONOMOUS VEHICLE SYSTEM FOR PERFORMING OBJECT DETECTIONS USING A LOGISTIC CYLINDER PEDESTRIAN MODEL

(71) Applicant: FORD GLOBAL TECHNOLOGIES, LLC, Dearborn, MI (US)

(72) Inventor: Kevin L. Wyffels, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 956 days.

(21) Appl. No.: 17/002,026

(22) Filed: Aug. 25, 2020

(65) Prior Publication Data

US 2022/0067399 A1 Mar. 3, 2022

(51) Int. Cl.
*G06V 20/58* (2022.01)
*G05D 1/00* (2006.01)
(Continued)

(52) U.S. Cl.
CPC .......... *G06V 20/58* (2022.01); *G05D 1/0088* (2013.01); *G05D 1/0223* (2013.01);
(Continued)

(58) Field of Classification Search
CPC .. G06V 20/58; G06F 18/2433; G05D 1/0088; G05D 1/0223; G05D 2201/0213; G01S 17/931; G01S 17/894
(Continued)

(56) References Cited

U.S. PATENT DOCUMENTS 10,509,947 B1    12/2019  Douillard et al.
11,526,706 B2 *  12/2022  Hunt ..................... G06V 20/647
(Continued)

FOREIGN PATENT DOCUMENTS

JP    2010205042 A  *  9/2010  ............. G01S 17/08

OTHER PUBLICATIONS

Matsuyama M, Nonaka K, Sekiguchi K. Estimation of pedestrian pose and velocity considering arm swing using point-cloud data. In2021 60th Annual Conference of the Society of Instrument and Control Engineers of Japan (SICE) Sep. 8, 2021 (pp. 99-104). IEEE. <https:// ieeexplore.ieee.org/abstract/document/9555343/.
(Continued)

*Primary Examiner* — Hung Q Nguyen
*Assistant Examiner* — Anthony Donald Taylor, Jr.
(74) *Attorney, Agent, or Firm* — Frank A. MacKenzie; Brooks Kushman P.C.

(57) ABSTRACT

A system obtains, from an autonomous vehicle, point cloud data, projects the point cloud data onto a two-dimensional plane, and determines an optimized center parameter value of an optimized circle and an optimized radius parameter value of the optimized circle that, collectively, maximizes a probability distribution of a center parameter and a radius parameter across the point cloud data. The system determines whether one or more of the data points of the point cloud data are located within the optimized circle. If there are, the system assigns a pedestrian class value to the point label of the data point. If there are data points of the point cloud data that are located outside of the optimized circle, they system assigns a non-pedestrian class value to the point label of the data point.

18 Claims, 7 Drawing Sheets

(51) Int. Cl.
    *G06F 18/2433*    (2023.01)
    *G01S 17/894*     (2020.01)
    *G01S 17/931*     (2020.01)

(52) U.S. Cl.
    CPC ........ *G06F 18/2433* (2023.01); *G01S 17/894* (2020.01); *G01S 17/931* (2020.01)

(58) Field of Classification Search
    USPC .......................................................... 701/110
    See application file for complete search history.

(56) References Cited

U.S. PATENT DOCUMENTS

| | | | |
|---|---|---|---|
| 2011/0282581 A1* | 11/2011 | Zeng | G01S 17/89 701/301 |
| 2019/0180467 A1* | 6/2019 | Li | G06V 20/64 |
| 2019/0332118 A1 | 10/2019 | Wang et al. | |
| 2020/0111358 A1* | 4/2020 | Parchami | G08G 1/056 |
| 2020/0191914 A1* | 6/2020 | Kunz | G01S 7/4808 |

OTHER PUBLICATIONS

Rabbani, T. et al., "Efficient Hough Transform for Automatic Detection of Cylinders in Point Clouds," ISPRS WG III/3, III/4, V/3 Workshop "Laser Scanning 2005," Enschede, the Netherlands, Sep. 12-14, 2005, pp. 60-65.

Liu, K. et al., "Pedestrian Detection with Lidar Point Clouds Based on Single Template Matching," School of Electronic and Information Engineering, Beihang University, Electronics 2018, 8, 780, doi:3390/electronics8070780, pp. 1-20, Jul. 11, 2019.

Hurl, B. et al, "Precise Synthetic Image and LiDAR Dataset for Autonomous Vehicle Perception," arXiv:1905.00160v2, [cs.CV], May 7, 2019.

* cited by examiner

AUTONOMOUS VEHICLE SYSTEM FOR PERFORMING OBJECT DETECTIONS USING A LOGISTIC CYLINDER PEDESTRIAN MODEL

BACKGROUND

It is sometimes difficult for an autonomous vehicle to cleanly and reliably segment detected LiDAR points that correspond to a pedestrian from those corresponding to objects that are nearby.

To resolve this problem, it is common to use early fusion techniques between camera and LiDAR data to transfer an image detection mask to the LiDAR points so that each LiDAR point has an object type label associated with it. If these labels were completely accurate, the split could be achieved by simply partitioning the points having pedestrian labels from those that do not. However, there may be sources of error in the label transfer that can cause simple partitioning to yield poor results. These sources of error can include, for example, image detection errors, temporal alignment errors between the LiDAR and image data, calibration errors between sensors, and degeneracies between 3D and 2D projections. Therefore, the challenge is to quickly and efficiently separate LiDAR points having inaccurate object type labels into their pedestrian and non-pedestrian parts.

Graph-cuts may be used to perform this segmentation. However, graph-cuts can be computationally complex and involve many tuning parameters.

This document describes methods and systems that are directed to addressing the problems described above, and/or other issues.

SUMMARY

A system includes an electronic device, and a computer-readable storage medium having one or more programming instructions. The programming instructions, when executed, cause the electronic device to obtain, from one or more sensors of an autonomous vehicle, point cloud data that includes one or more data points, project the point cloud data onto a two-dimensional plane, determine an optimized center parameter value of an optimized circle and an optimized radius parameter value of the optimized circle that, collectively, maximize a probability distribution of a center parameter and a radius parameter across the point cloud data, determine whether one or more of the data points of the point cloud data are located within the optimized circle, in response to determining that one or more of the data points of the point cloud data are located within the optimized circle, for each data point that is located within the optimized circle, assign a pedestrian class value to the point label of the data point, determine whether one or more of the data points of the point cloud data are located outside of the optimized circle, and in response to determining that one or more of the data points of the point cloud data are located outside of the optimized circle, for each data point that is located outside of the optimized circle, assign a non-pedestrian class value to the point label of the data point. At least one of the one or more data points is labeled as corresponding to a pedestrian class. Each data point in the point cloud data is represented by a two-dimensional location and a point label.

The system may utilize a brute force search to yield the optimized center parameter value and the optimized radius parameter value. The system may utilize a gradient ascent algorithm to yield the optimized center parameter value and the optimized radius parameter value.

The system may determine whether one or more of the data points of the point cloud data are located within the optimized circle by identifying a target data point from the one or more of the data points, and determining a signed distance value associated with the target data point. The system may determine a signed distance value by determining a Euclidean norm of a difference between the two-dimensional location of the target data point and the optimized center parameter value to generate a first value, and determining a difference between the first value and the optimized radius parameter value.

In response to the difference between the first value and the optimized radius parameter value being negative, the system may determine that the target data point is located within the optimized circle.

The system may determine whether one or more of the data points of the point cloud data are located outside of the optimized circle by identifying a target data point from the one or more of the data points, and determining a signed distance value associated with the target data point. The system may determine a signed distance value by determining a Euclidean norm of a difference between the two-dimensional location of the target data point and the optimized center parameter value to generate a first value, and determining a difference between the first value and the optimized radius parameter value. In response to the difference between the first value and the optimized radius parameter value being positive, the system may determine that the target data point is located outside of the optimized circle.

The system may be configured to, in response to detecting an object associated with one or more of the data points to which the pedestrian class value has been assigned, execute one or more vehicle control instructions that cause adjust of one or more driving operations of the autonomous vehicle. The one or more vehicle control instructions may further include one or more vehicle control instructions that cause the autonomous vehicle to reduce its speed when the autonomous vehicle is within a distance from the object.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
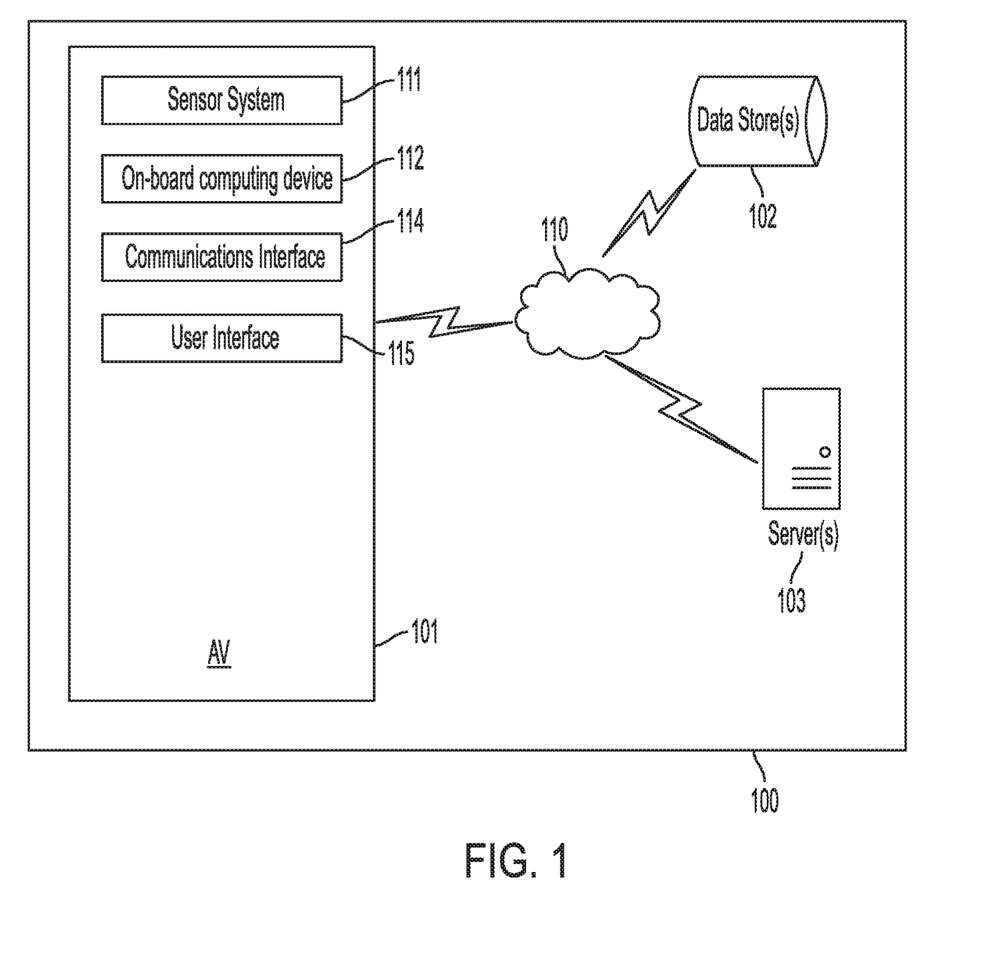
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located. Generally, LIDAR system is a device that incorporates optical remote sensing technology that can measure distance to a target and/or other properties of a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LIDAR systems for collecting data pertaining to the surface may be included in systems other than the autonomous vehicle 101 such as, without limitation, other vehicles (autonomous or driven), robots, satellites, etc.

Figure 2:
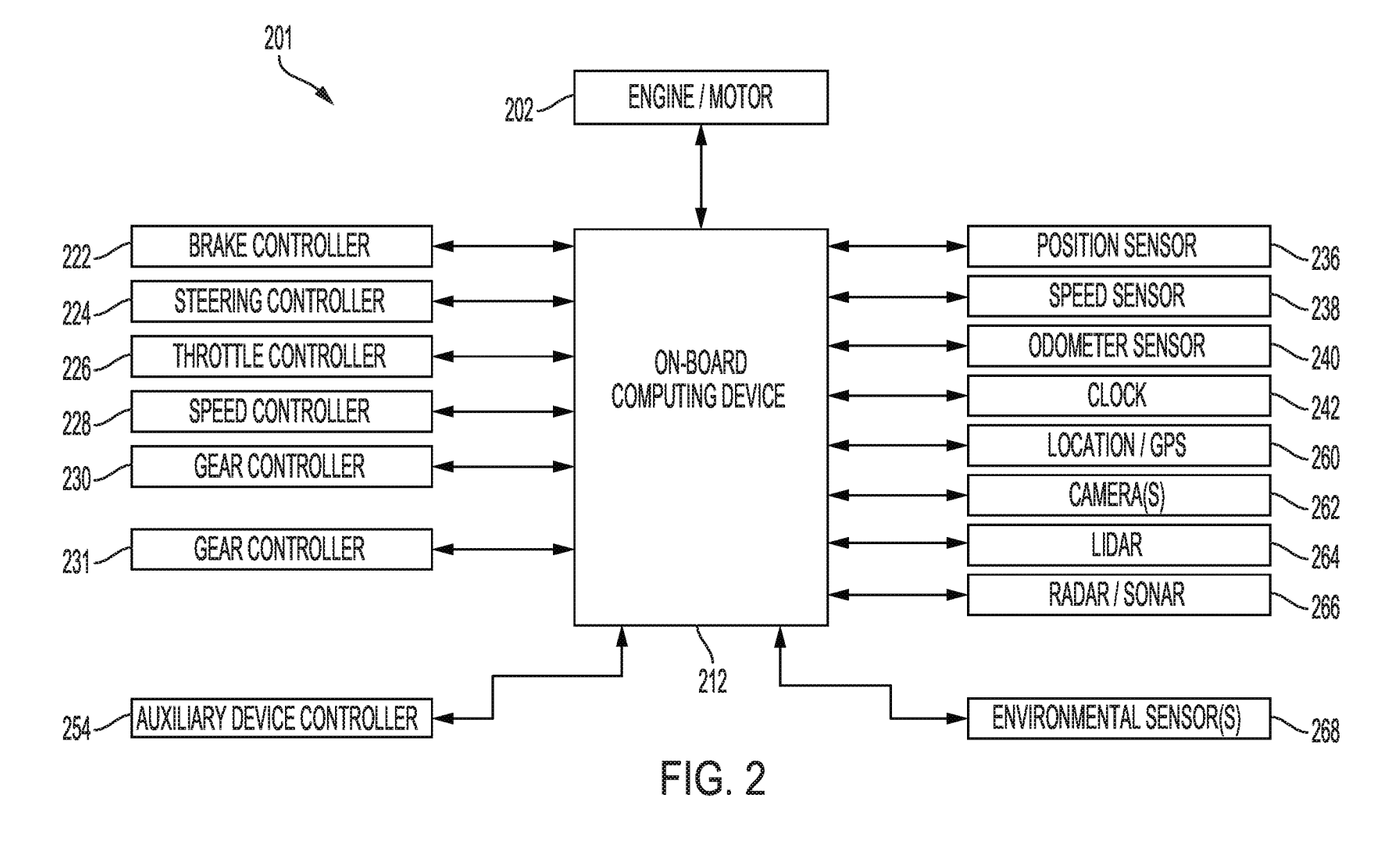
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
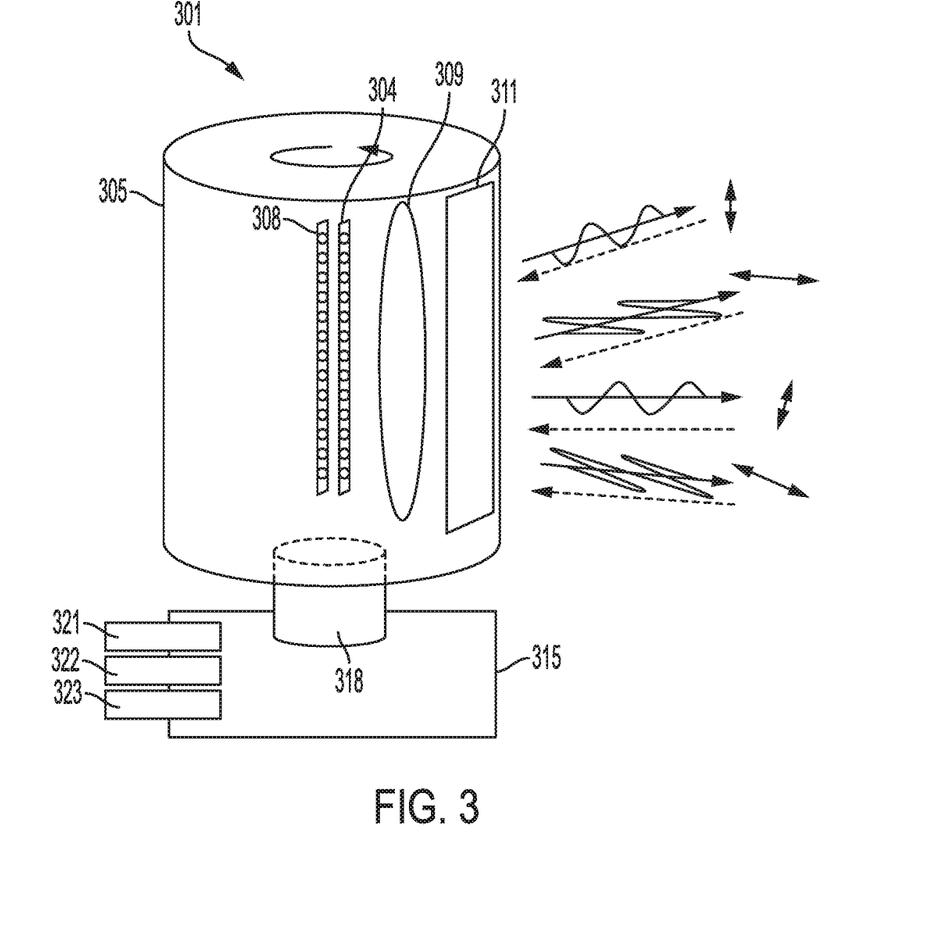
FIG. 3 shows an example LiDAR system.

FIG. 3 shows an example LiDAR system 301 as may be used in various embodiments. As shown in FIG. 3, the LiDAR system 301 includes a housing 305 which may be rotatable 360° about a central axis such as hub or axle 318. The housing may include an emitter/receiver aperture 311 made of a material transparent to light. Although the example shown in FIG. 3 has a single aperture, in various embodiments, multiple apertures for emitting and/or receiving light may be provided. Either way, the system can emit light through one or more of the aperture(s) 311 and receive reflected light back toward one or more of the aperture(s) 311 as the housing 305 rotates around the internal components. In an alternative embodiment, the outer shell of housing 305 may be a stationary dome, at least partially made of a material that is transparent to light, with rotatable components inside of the housing 305.

Inside the rotating shell or stationary dome is a light emitter system 304 that is configured and positioned to generate and emit pulses of light through the aperture 311 or through the transparent dome of the housing 305 via one or more laser emitter chips or other light emitting devices. The emitter system 304 may include any number of individual emitters, including for example 8 emitters, 64 emitters or 128 emitters. The emitters may emit light of substantially the same intensity, or of varying intensities. The individual beams emitted by 304 will have a well-defined state of polarization that is not the same across the entire array. As an example, some beams may have vertical polarization and other beams may have horizontal polarization.

The LiDAR system will also include a light detector 308 containing a photodetector or array of photodetectors positioned and configured to receive light reflected back into the system. The emitter system 304 and detector 308 would rotate with the rotating shell, or they would rotate inside the stationary dome of the housing 305. One or more optical element structures 309 may be positioned in front of the light emitting unit 304 and/or the detector 308 to serve as one or more lenses or waveplates that focus and direct light that is passed through the optical element structure 309.

The LiDAR system will include a power unit 321 to power the light emitter unit 304, a motor 323 that can turn the axle 318, the housing 305 or other components, and electronic components. The LiDAR system will also include an analyzer 315 with elements such as a processor 322 and non-transitory computer-readable memory 323 containing programming instructions that are configured to enable the system to receive data collected by the light detector unit, analyze it to measure characteristics of the light received, and generate information that a connected system can use to make decisions about operating in an environment from which the data was collected. Optionally, the analyzer 315 may be integral with the LiDAR system 301 as shown, or some or all of it may be external to the LiDAR system and communicatively connected to the LiDAR system via a wired or wireless communication network or link. For example, the motor 323 may be integral with the LiDAR system, but the processor 322 and/or memory 323 may be remote from the other components.

Figure 4:
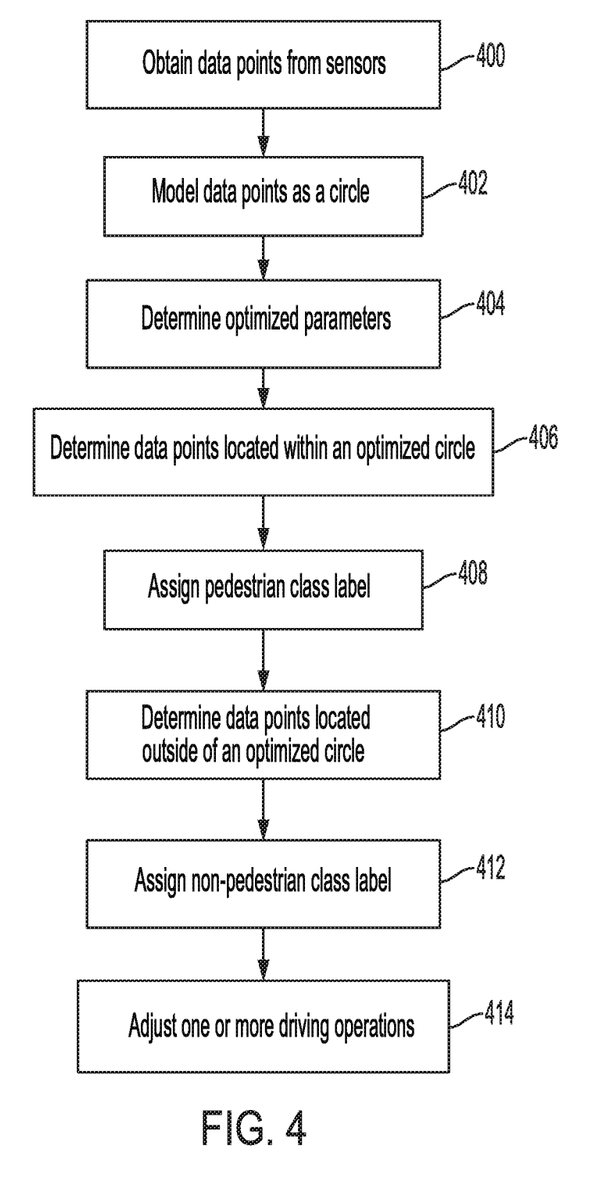
FIG. 4 illustrates an example method of segmenting data points by an autonomous vehicle.

FIG. 4 illustrates an example method of segmenting data points by an autonomous vehicle according to an embodiment. An on-board computing device may obtain 400 data points from one or more sensors such as, for example, one or more cameras, LiDAR, and/or the like. One or more data points may be labeled with an object type designator indicating the object to which the object corresponds. Examples of objects may include vehicles, bicycles, pedestrians, and/or the like.

In various embodiments, the system may model 402 at least a portion of the obtained data points as a circle in the x-y plane. The circle may have a center represented as C, and a radius represented as r. The system may project one or more of the data points onto the x-y plane to accomplish this modeling. Each data point may be associated with an indication of its two-dimensional location and a point label. The point label may indicate the object type to which the system determined the point corresponds. For example, each of the n points, $Z_i \forall l \in \{1, \ldots, n\}$ may be represented by its two-dimensional location, $P_l$, and its point label, $L_l$, as $Z_1=[P_l, L_l]$.

In various embodiments, the joint probability of C and r conditioned on the labeled point set may be represented as:

$$p(C, r | Z_1, \ldots, Z_n) = \prod_{l=1}^{n} p(C, r | Z_\ell)$$

$$p(C, r | Z_\ell) = \begin{cases} f(d_\ell) & \text{If } L_\ell \neq \text{Pedestrian} \\ 1 - f(d_\ell) & \text{If } L_\ell = \text{Pedestrian} \end{cases}$$

In various embodiments, $d_l$ is the signed distance between a data point and the boundary of the circle, which may be represented as:

$d_l=|P_l-C|-r$

The signed distance, $d_l$, therefore represents a shortest distance between a data point and the boundary of the circle. The sign of the value of $d_l$ indicates whether the point is inside the circle or outside of the circle. For instance, if $d_l$ is positive, it may indicate that the point is outside of the circle (e.g., the distance from the point to C is greater than r). If $d_l$ is negative, it may indicate that the point is within the circle (e.g., the distance from the point to C is less than r).

In various embodiments, |·| is the $L_2$ norm or Euclidean norm of the difference of $P_l$ and C, and f (·) is a logistic function with an inflection point at the boundary of the circle where $d_1=0$. In this situation, f ($d_l$) can be represented as the following, where γ represents a sharpness tuning parameter:

$$f(d_\ell) = \frac{1}{1 + \exp(-\gamma d_\ell)}$$

The sharpness tuning parameter, γ, may be greater than zero. As $d_l$ approaches infinity, $f(d_l)$ approaches a step function at $d_l=0$ (i.e., f $(d_l)=0$ if $d_l<0$ and f $(d_l)=1$ if $d_l>0$).

Referring back to FIG. 4, the system may determine 404 an optimized center parameter value and an optimized radius parameter value that, collectively, maximize a probability distribution of C and r across the point cloud data. In various embodiments, the system may determine 404 an optimized center parameter value and or/an optimized radius parameter value via one or more numerical optimization methods that jointly maximize p (C, r|$Z_l, \ldots Z_n$). For example, the system may use a brute force search (e.g., a grid search), one or more gradient ascent algorithms, and/or the like.

The system may determine 406 which of the data points are located within an optimized circle. An optimized circle is one defined by the optimized center parameter value and the optimized radius parameter value. For instance, the system may determine a position of one or more data points relative to a circle defined by the optimized center parameter value and the optimized radius parameter value to determine whether the data point, based on its location value, is within the circle or outside of the circle.

For one or more of the data points that the system determines is within the optimized circle, the system may update the point label of the data point by assigning 408 the data point a point label value indicative of pedestrian if the data point is not already labeled as such.

The system may determine 410 which of the data points are located outside of an optimized circle. For one or more of the data points that the system determines is outside of the optimized circle, the system may update the point label of the data point by assigning 412 the data point a point label value that is not indicative of a pedestrian if the data point is not already labeled as such.

Figure 5A:
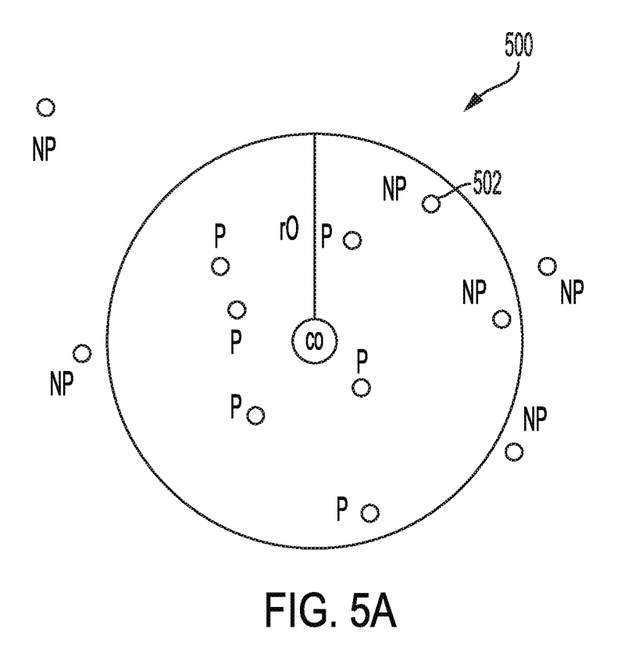
FIGS. 5A and 5B illustrate example optimized circles and example data points according to various embodiments.
Figure 5B:
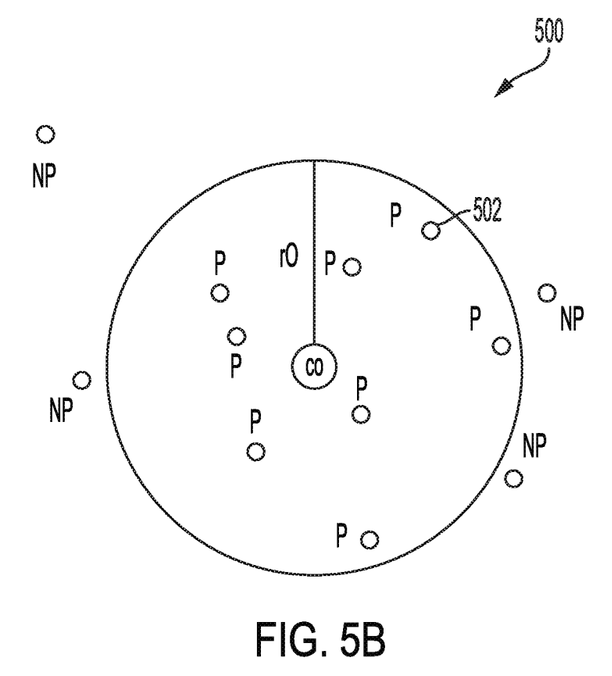

For example, FIG. 5A illustrates an optimized circle 500 having a center, $C_O$, and a radius, $r_O$, relative to a set of data points. As illustrated by FIG. 5A, some of the data points have point labels of "pedestrian" while some of the data points have point labels of "vehicle". FIG. 5B illustrates how the point labels of these points are updated based on their position relative to the optimized circle. For instance, data point 502 has a point label of "non-pedestrian" (NP) in FIG. 5A. However, because this data point is located within the optimized circle 500, its point label is updated to "pedestrian" (P).

Referring back to FIG. 4, the updated point labels may be used by an on-board computing device to adjust 414 one or more driving operations of an autonomous vehicle. For example, the system may cause an autonomous vehicle to accelerate, decelerate, brake, change direction, adjust its trajectory, and/or perform one or more collision avoidance operations based on the updated point label values.

As an example, referring back to FIG. 2, an on-board computing device may receive at least a portion of the data points having updated point label values, and may analyze the data points to execute one or more vehicle control instructions. For instance, in response to analyzing one or more data points having updated point labels indicating a pedestrian class, an on-board computing device may execute one or more control instructions that cause the autonomous vehicle to decelerate or brake when it is a certain distance away from an object that is associated with data points having the pedestrian class value.

As another example, an on-board computing device may execute one or more control instructions that cause the autonomous vehicle to adjust its trajectory when it is a certain distance away from an object that is associated with data points having the pedestrian class value in order to increase the distance between the autonomous vehicle and the object. Additional and/or alternate driving operations may be performed within the scope of this disclosure.

Figure 6:
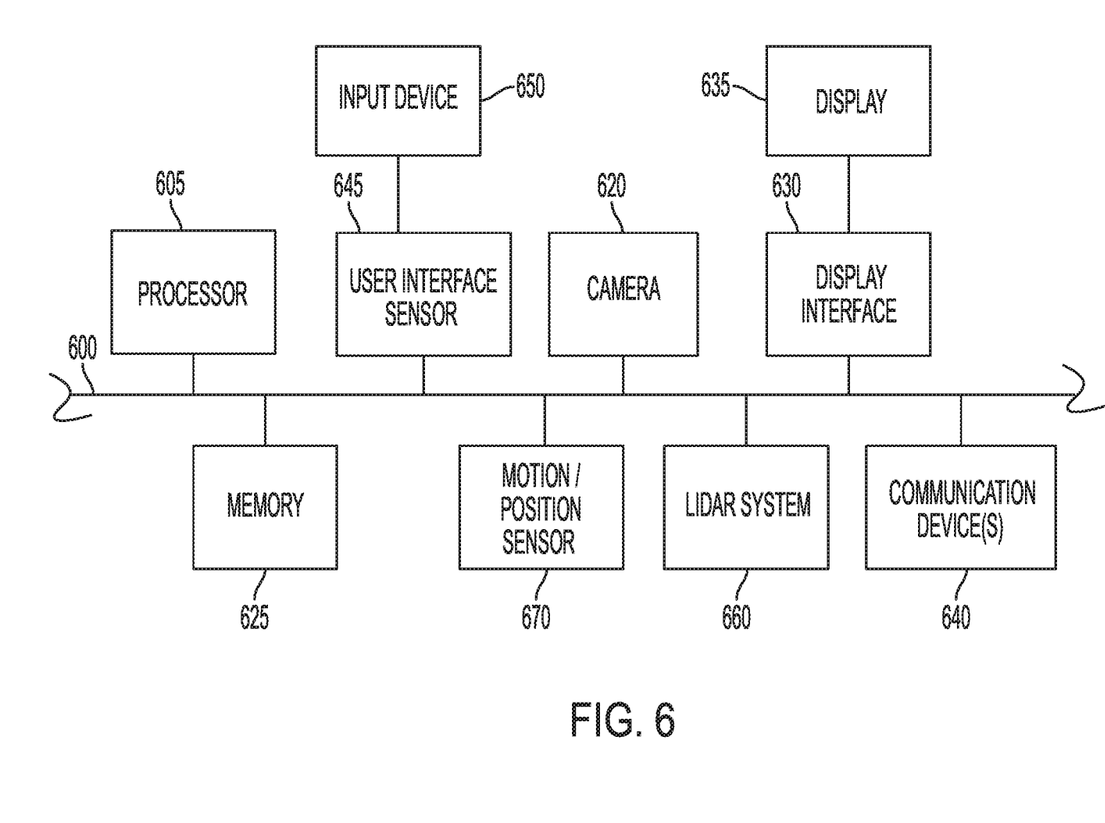
FIG. 6 is a block diagram that illustrates various elements of a possible electronic system, subsystem, controller and/or other component of an AV, and/or external electronic device.

FIG. 6 depicts an example of internal hardware that may be included in any of the electronic components of the system, such as internal processing systems of the AV, external monitoring and reporting systems, or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format, such on an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may receive data from a LiDAR system 660 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The terms "intersection" means a location where two or more streets meet or cross each other.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method, comprising:
    obtaining, by one or more sensors of an autonomous vehicle, point cloud data that includes one or more data points, wherein each data point of the one or more data points has a point label associated therewith;
    defining, by an electronic device, an optimized circle in a two-dimensional plane by:
        projecting the one or more data points of the point cloud data onto the two-dimensional plane, wherein each data point in the point cloud data is represented by a two-dimensional location and the point label; and
        using the two-dimensional location of each data point to determine an optimized center parameter value of the optimized circle and an optimized radius parameter value of the optimized circle that, collectively, maximize a probability distribution of a center parameter and a radius parameter across the point cloud data;
    determining whether one or more of the data points of the point cloud data are located within the optimized circle;
    in response to determining that one or more of the data points of the point cloud data are located within the optimized circle, for each data point that is located within the optimized circle, assigning a pedestrian class value to the point label of the data point;
    determining whether one or more of the data points of the point cloud data are located outside of the optimized circle;
    in response to determining that one or more of the data points of the point cloud data are located outside of the optimized circle, for each data point that is located outside of the optimized circle, assigning a non-pedestrian class value to the point label of the data point; and
    using, by the electronic device, the point cloud data to control one or more driving operations of the autonomous vehicle.

2. The method of claim 1, wherein determining the optimized center parameter value and the optimized radius parameter value comprises one or more of the following:
    utilizing a brute force search to yield the optimized center parameter value and the optimized radius parameter value; and
    utilizing a gradient ascent algorithm to yield the optimized center parameter value and the optimized radius parameter value.

3. The method of claim 1, wherein determining whether one or more of the data points of the point cloud data are located within the optimized circle comprises:
    identifying a target data point from the one or more data points; and
    determining a signed distance value associated with the target data point by:
        determining a Euclidean norm of a difference between the two-dimensional location of the target data point and the optimized center parameter value to generate a first value, and
        determining a difference between the first value and the optimized radius parameter value.

4. The method of claim 3, further comprising:
    in response to the difference between the first value and the optimized radius parameter value being negative, determining that the target data point is located within the optimized circle.

5. The method of claim 1, wherein determining whether one or more of the data points of the point cloud data are located outside of the optimized circle comprises:
    identifying a target data point from the one or more data points; and
    determining a signed distance value associated with the target data point by:
        determining a Euclidean norm of a difference between the two-dimensional location of the target data point and the optimized center parameter value to generate a first value, and
        determining a difference between the first value and the optimized radius parameter value.

6. The method of claim 5, further comprising:
    in response to the difference between the first value and the optimized radius parameter value being positive, determining that the target data point is located outside of the optimized circle.

7. The method of claim 1, further comprising:
    in response to detecting an object associated with one or more of the data points to which the pedestrian class value has been assigned, executing one or more vehicle control instructions that cause adjustment of the one or more driving operations of the autonomous vehicle.

8. The method of claim 7, wherein the one or more vehicle control instructions comprise one or more vehicle control instructions that cause the autonomous vehicle to reduce speed when the autonomous vehicle is within a certain distance from the object.

9. A system, comprising:
an electronic device; and
a computer-readable storage medium comprising one or more programming instructions that, when executed, cause the electronic device to:
obtain, from one or more sensors of an autonomous vehicle, point cloud data that includes one or more data points, wherein each data point of the one or more data points has a point label associated therewith;
define an optimized circle in a two-dimensional plane by:
projecting the point cloud data onto the two-dimensional plane, wherein each data point in the point cloud data is represented by a two-dimensional location and the point label, and
using the two-dimensional location of each data point to determine an optimized center parameter value of the optimized circle and an optimized radius parameter value of the optimized circle that, collectively, maximize a probability distribution of a center parameter and a radius parameter across the point cloud data;
determine whether one or more of the data points of the point cloud data are located within the optimized circle;
in response to determining that one or more of the data points of the point cloud data are located within the optimized circle, for each data point that is located within the optimized circle, assign a pedestrian class value to the point label of the data point;
determine whether one or more of the data points of the point cloud data are located outside of the optimized circle;
in response to determining that one or more of the data points of the point cloud data are located outside of the optimized circle, for each data point that is located outside of the optimized circle, assign a non-pedestrian class value to the point label of the data point; and
use the point cloud data to control one or more driving operations of the autonomous vehicle.

10. The system of claim 9, wherein the one or more programming instructions that, when executed, cause the electronic device to determine the optimized center parameter value and the optimized radius parameter value comprise one or more programming instructions that, when executed, cause the electronic device to perform one or more of the following:
utilize a brute force search to yield the optimized center parameter value and the optimized radius parameter value; and
utilize a gradient ascent algorithm to yield the optimized center parameter value and the optimized radius parameter value.

11. The system of claim 9, wherein the one or more programming instructions that, when executed, cause the electronic device to determine whether one or more of the data points of the point cloud data are located within the optimized circle comprise one or more programming instructions that, when executed, cause the electronic device to:
identify a target data point from the one or more data points; and
determine a signed distance value associated with the target data point by:
determining a Euclidean norm of a difference between the two-dimensional location of the target data point and the optimized center parameter value to generate a first value, and
determining a difference between the first value and the optimized radius parameter value.

12. The system of claim 11, wherein the computer-readable storage medium further comprises one or more programming instructions that, when executed, cause the electronic device to:
in response to the difference between the first value and the optimized radius parameter value being negative, determine that the target data point is located within the optimized circle.

13. The system of claim 9, wherein the one or more programming instructions that, when executed, cause the electronic device to determine whether one or more of the data points of the point cloud data are located outside of the optimized circle comprise one or more programming instructions that, when executed, cause the electronic device to:
identify a target data point from the one or more data points; and
determine a signed distance value associated with the target data point by:
determining a Euclidean norm of a difference between the two-dimensional location of the target data point and the optimized center parameter value to generate a first value, and
determining a difference between the first value and the optimized radius parameter value.

14. The system of claim 13, wherein the computer-readable storage medium further comprises one or more programming instructions that, when executed, cause the electronic device to:
in response to the difference between the first value and the optimized radius parameter value being positive, determine that the target data point is located outside of the optimized circle.

15. The system of claim 9, wherein the computer-readable storage medium further comprises one or more programming instructions that, when executed, cause the electronic device to, in response to detecting an object associated with one or more of the data points to which the pedestrian class value has been assigned, execute one or more vehicle control instructions that cause adjustment of the one or more driving operations of the autonomous vehicle.

16. The system of claim 15, wherein the one or more vehicle control instructions comprise one or more vehicle control instructions that cause the autonomous vehicle to reduce speed when the autonomous vehicle is within a certain distance from the object.

17. A non-transitory computer-readable medium that stores instructions that, when executed by at least one computing device, will cause the at least one computing device to perform computing operations comprising:
obtaining point cloud data that includes one or more data points, wherein each data point of the one or more data points has a point label associated therewith;
defining an optimized circle in a two-dimensional plane by:
projecting the data points of the point cloud data onto the two-dimensional plane, where each data point in the point cloud data is represented by a two-dimensional location and the point label; and using the two-dimensional location of each data point to determine an optimized center parameter value of the optimized circle and an optimized radius parameter value that, collectively, maximize a probability distribution of a center parameter and a radius parameter across the point cloud data;

determining whether one or more of the data points of the point cloud data are located within the optimized circle;

in response to determining that one or more of the data points of the point cloud data are located within the optimized circle, for each data point that is located within the optimized circle, assigning a pedestrian class value to the point label of the data point;

determining whether one or more of the data points of the point cloud data are located outside of the optimized circle;

in response to determining that one or more data points of the point cloud data are located outside of the optimized circle, for each data point that is located outside of the optimized circle, assigning a non-pedestrian class value to the point label of the data point; and using the point cloud data to control one or more driving operations of an autonomous vehicle.

18. The method of claim 1, wherein the one or more data points includes a first data point having a non-pedestrian point label, the method further comprising:

responsive to determining that the first data point is located within the optimized circle, revising the point label of the first data point to a pedestrian point label.

* * * * *